United States Patent [19]

Burmeister et al.

[11] Patent Number: 5,029,489

[45] Date of Patent: Jul. 9, 1991

[54] STEERING COLUMN WITH VERTICALLY ADJUSTABLE STEERING WHEEL FOR MOTOR VEHICLES

[75] Inventors: Joachim Burmeister, Bad Essen; Burkhard Schafer, Lemförde; Norbert Bauch, Eydelstedt, all of Fed. Rep. of Germany

[73] Assignee: Lemforder Metallwaren AG, Lemforde, Fed. Rep. of Germany

[21] Appl. No.: 517,828

[22] Filed: May 2, 1990

[30] Foreign Application Priority Data

May 3, 1989 [DE] Fed. Rep. of Germany ........ 3914608

[51] Int. Cl.[5] .............................................. B62D 1/18
[52] U.S. Cl. ........................................ 74/493; 74/492; 74/527; 280/775
[58] Field of Search ................ 74/492, 493, 527, 529, 74/530, 534, 531; 280/775

[56] References Cited

U.S. PATENT DOCUMENTS

| | | | |
|---|---|---|---|
| 3,167,972 | 2/1965 | Durgin | 74/527 |
| 3,776,062 | 12/1973 | Ito | 74/527 X R |
| 3,791,223 | 2/1974 | Treichel et al. | 74/493 |
| 4,793,204 | 12/1988 | Kubasiak | 74/493 |

Primary Examiner—Allan D. Herrmann
Assistant Examiner—Julie Krolikowski
Attorney, Agent, or Firm—McGlew & Tuttle

[57] ABSTRACT

A steering column for motor vehicles with axially adjustable steering shaft and positive locking between an axially adjustable, non-rotatably mounted steering column jacket and a support bearing that forms a rigid part of the vehicle body is described, wherein the locking mechanism consists of teeth provided on the circumference of the steering column jacket and teeth engaging in same, which latter teeth are provided on a locking element movably anchored in the support bearing, as well as of wedge bodies which can be moved into a locked position that brings about locking. The locking element is able to perform a limited pivoting motion around an axis arranged at right angles to the longitudinal axis of the steering column and can be displaced in the direction of the plane of engagement of the teeth at least by one tooth pitch, wherein next to a wedge body which tensions during its functioning the teeth on the steering column jacket and on the locking element at right angles to the longitudinal axis of the steering column, further wedge bodies are provided, which during their functioning wedge the locking element in the direction of the plane of engagement of the teeth against the support bearing.

14 Claims, 4 Drawing Sheets

STEERING COLUMN WITH VERTICALLY ADJUSTABLE STEERING WHEEL FOR MOTOR VEHICLES

FIELD OF THE INVENTION

The present invention relates generally to steering columns for motor vehicles with steering shaft adjustable in the axial direction with positive locking between axially adjustable non-rotably mounted steering column jacket, and more particularly to a new and useful steering column with a locking means with limited pivoting movement.

BACKGROUND OF THE INVENTION

There are known designs for positive locking of the adjustable part in a support bearing fastened to the body with teeth on one part of the steering column, mostly on the adjustable part, and with a locking member that can be moved via an actuating device, possibly against the force of a spring biasing the locking mechanism in the locked position with complimentarily designed teeth.

However, positive-locking mechanisms consisting of meshing teeth on parts that are adjustable axially relative to one another can be adjusted only in finite positions. Nevertheless, they offer the advantage of snap locking, so that it is possible to transmit strong forces, which might lead to slip in the case of friction clamping, in the axial direction. Positive locking is therefore preferable in steering columns for absorbing strong forces occurring during crashes.

An essential disadvantage of such positive locking is, however, the inevitable "tip-over-tip" position of the meshing teeth on the two parts of the steering column, which are axially adjustable relative to one another. Such a position, in which interlocking cannot be guaranteed, cannot be avoided with certainty even if the tips of the teeth are of a pointed design. Locking and consequently defined catching can be achieved in such a case only by repeated pressure on the adjustable part, i.e., for example, the steering wheel. This may give rise to unfavorable effects which are unacceptable in a vehicle for safety reasons. After the alleged locking of a newly set position of the steering wheel, a lifting movement by half the pitch of the teeth of the locking members becomes established, which suggests free movement to the driver of the motor vehicle, who might interpret this as a malfunction. The "tip-over-tip" position during a crash occurring immediately thereafter can lead to slipping of the teeth, because no appreciable lifting movement leading to locking will occur because of the inertias of all the components involved in the catching.

SUMMARY OF THE INVENTION

The present invention provides a positive-locking mechanism for a steering column with the characteristics of this class so that positive-locking meshing of the teeth is guaranteed at all times.

The invention provides a locking member pivotally mounted to the support bearing and disposed to perform limited pivoting movement and having a pivot axis which is perpendicular to the axis of the steering column jacket. The steering column jacket has a row of longitudinal teeth and the locking mechanism has teeth arranged to mesh with the longitudinal row of teeth. The locking mechanism is longitudinally displaceable by an amount which is at least the length of one tooth pitch of the locking mechanism teeth. A first wedge body is arranged to arrest the longitudinal movement of the locking member and a second wedge body is disposed to bias the locking member teeth to engage with the longitudinal row of teeth.

The invention provides reliable meshing of teeth in any arbitrary position. An infinitely great number of intermediate positions, in which the teeth engage with one another more or less deeply and are in contact with each other on their flanks, are possible between limiting positions in which the teeth of the locking member fully engage with the opposite teeth or are positioned on the tips of the opposite teeth. Due to the fact that the locking members are movable in the direction of the plane of engagement of the teeth, the locking member is automatically displaced by an amount which permits complete engagement of the teeth. In this position of complete meshing of the teeth, the locking member is effectively wedged both in the direction of the axial displacement of the locking member and at right angles thereto, as a result of which the newly set position is safely locked. The locking member includes inner walls with contours that lock rotatable eccentrically shaped wedge bodies when the wedge bodies are in a locked position and release when the wedge bodies are in an unlocked position. Cooperating elements such as another wedge body, and springs attached to the vehicle body bias the wedge bodies toward the locking position.

To achieve easier motion by symmetrically tensioning the parts, wherein the locking elements and wedge bodies are arranged in pairs and are in mirror inverted symmetry relative to an imaginary plane passing through the central longitudinal axis of the steering column, thereby providing two locking members, one on each side of the steering column.

In a preferred embodiment, a first wedge body is movable in a straight line between an abutment on the locking member and an abutment on the support bearing, and a second wedge body is designed as a pair of eccentrics movable around the pivot axis of the locking member. The pair is mounted in recesses of the locking member and, mounted, on a pivot pin extending at right angles. The locking member includes inner walls with contours that lock rotatable eccentrically shaped wedge bodies when the wedge bodies are in a locked position and release when the wedge bodies are in an unlocked position. Cooperating elements such as another wedge body, and springs attached to the vehicle body bias the wedge bodies toward the locking position. The wedge surfaces of the eccentrics cooperate with wedge surfaces on the inner walls defining the recesses of the locking member. This makes it possible to release the radially acting wedge and the axially acting wedge of the locking member by moving a common actuating member. In addition, the invention makes it possible to provide springs in a relatively simple manner, wherein the springs bias the wedge body radially on one hand, and the wedge body being designed as an eccentric, which in turn wedges the locking member in the axial direction, on the other hand.

According to this design, the locking member is connected to another spring which automatically brings the released locking member into a middle position, as a result of which very short displacements of the locking member in the axial direction are achieved during the locking of a newly set position.

The movement of the first wedge body is dependent on the movement of the second wedge body in that the first wedge body has one or more arms which extend into a recess of the second wedge body and upon longitudinal movement of the second wedge body the first wedge body is provided with a pivotal movement.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

DETAILED DESCRIPTION OF THE PREFERRED EMBODIMENT

Figure 1:
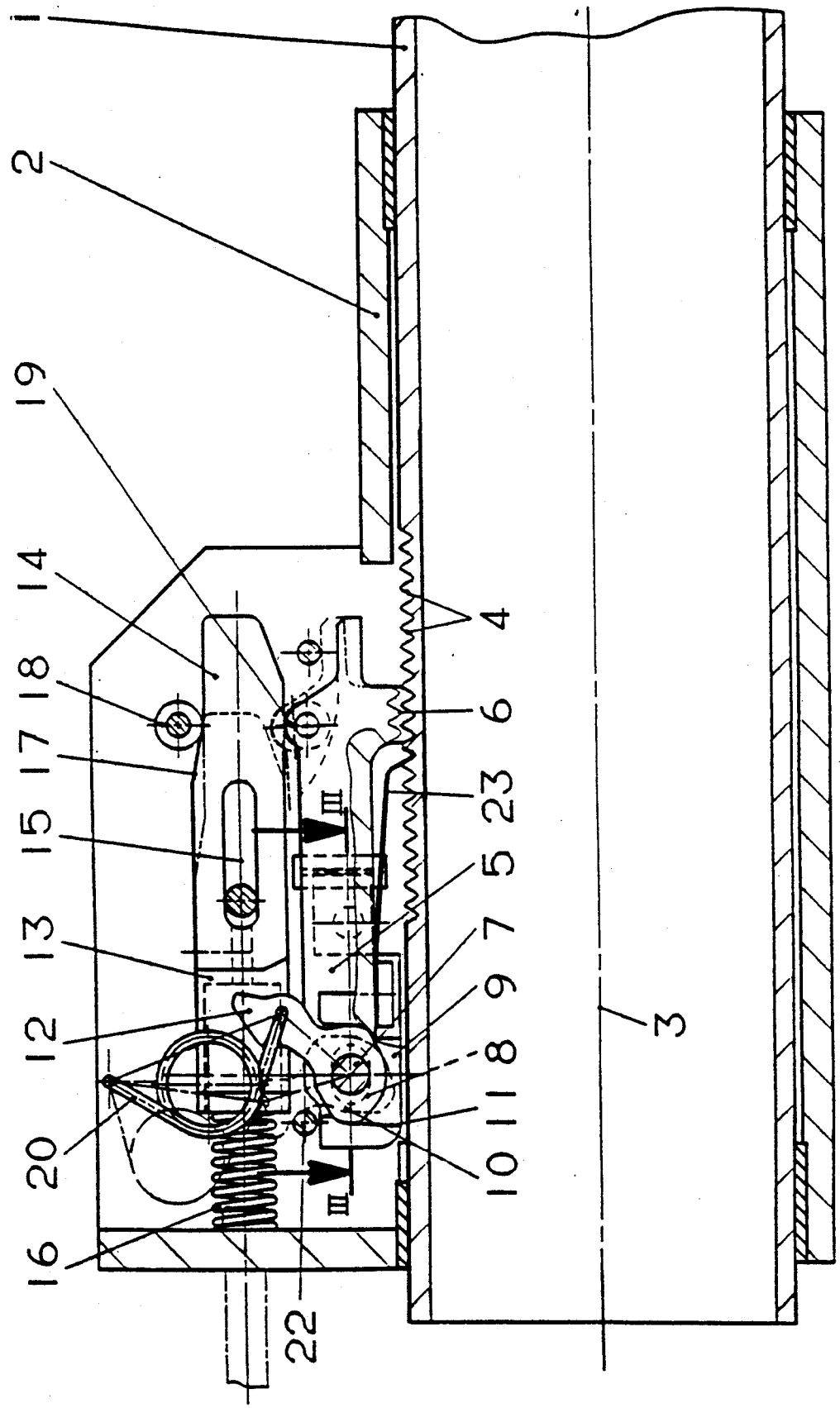
FIG. 1 is a longitudinal section in an axial plane through a first embodiment.
Figure 2:
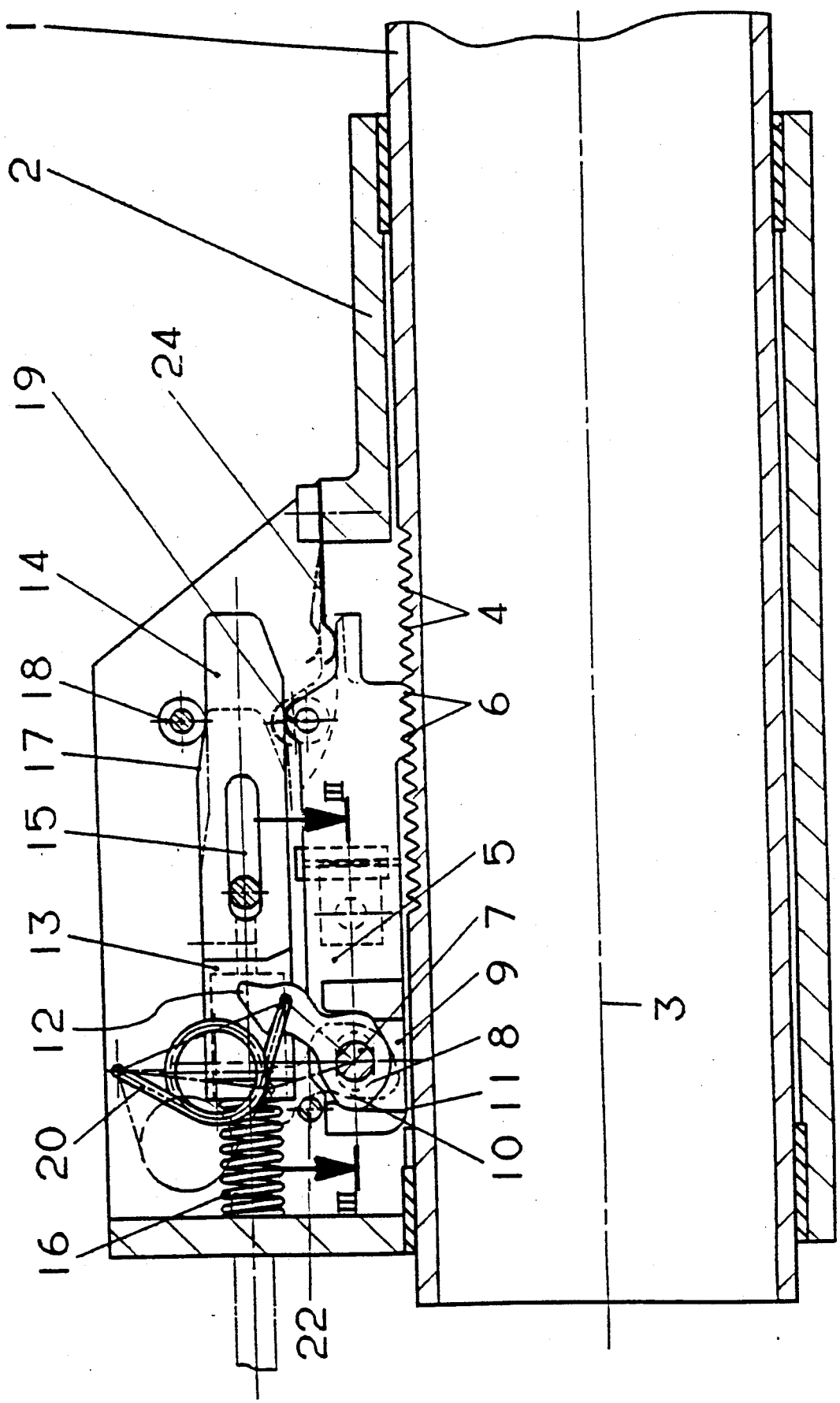
FIG. 2 is a longitudinal section in an axial plane through a second embodiment.
Figure 3:
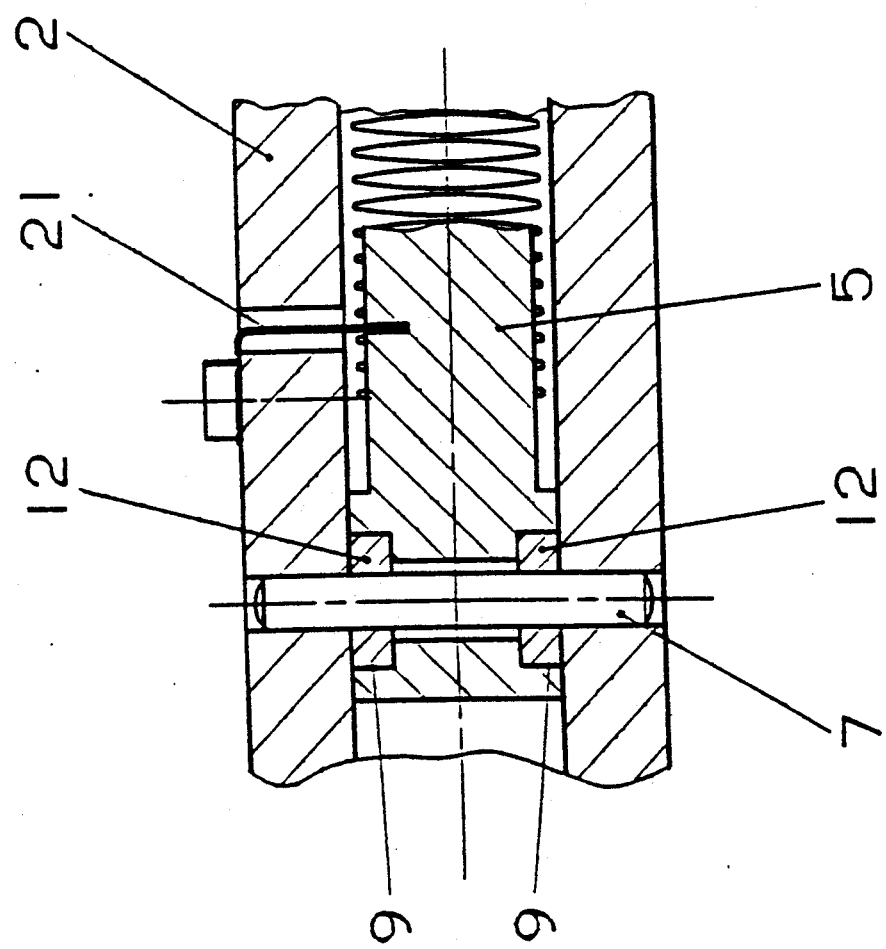
FIG. 3 is an enlarged partial longitudinal section taken along the line III—III of FIGS. 1 and 2 and FIG. 4 is an embodiment similar to that shown in FIG. 1 having two axially opposed locking members with parts not shown for clarity on one-half thereof.
Figure 4:
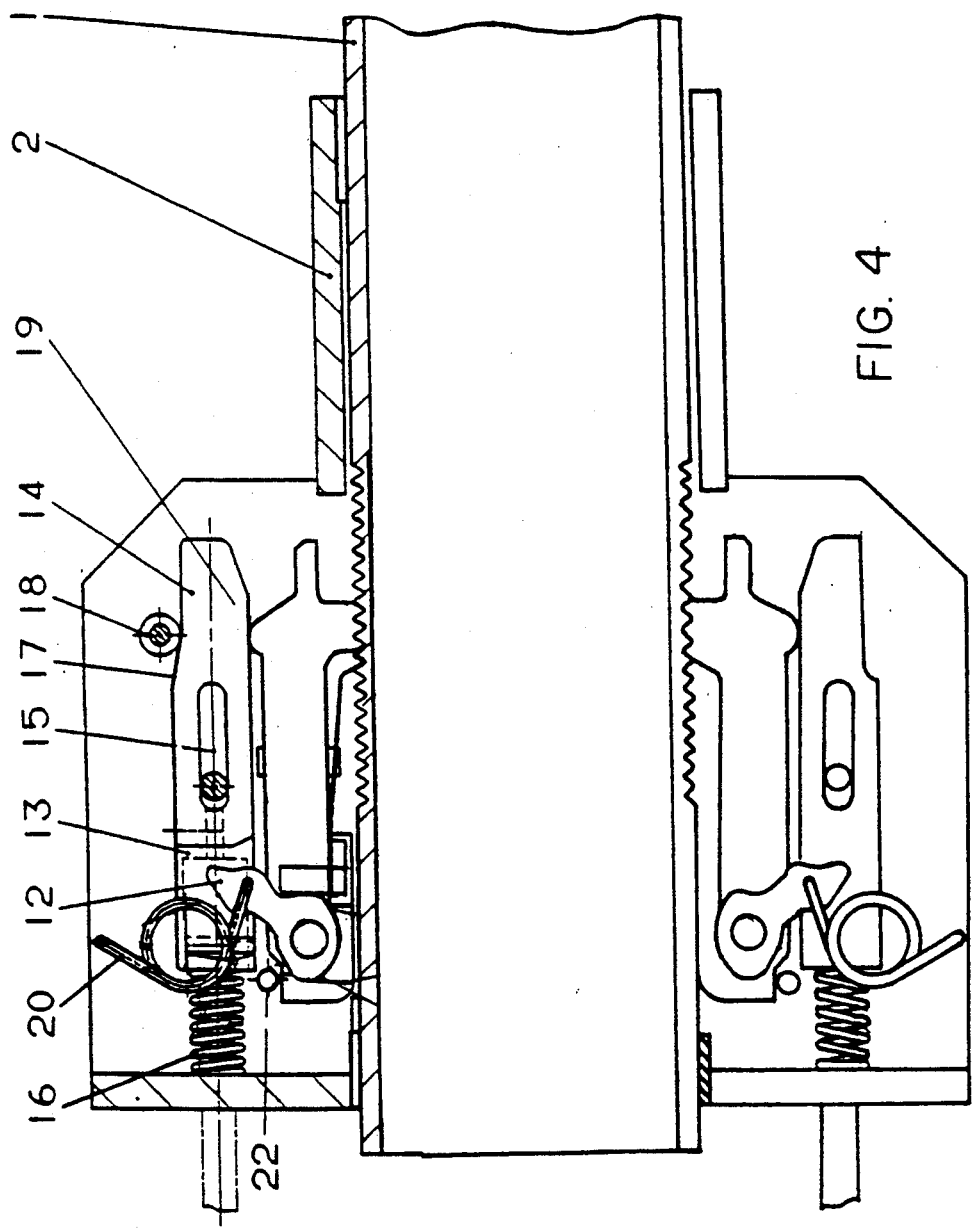

A steering column jacket for motor vehicle which is arranged non-rotatably, is designated by reference numeral 1. The steering column jacket is adjustable in the direction of the longitudinal axis 3 in a support bearing 2 rigidly attached to the vehicle body. To lock the set position of the steering column jacket 1 relative to the support bearing 2, teeth 4 are provided over part of the circumference of the steering column jacket 1. To lock the set position of the steering column jacket 1 with the support bearing 2, a locking member 5 is used, which has teeth 6, designed as complementary teeth to the teeth 4, likewise in a partial area whose longitudinal extension in parallel to the axis 3 is, however, substantially shorter than the partial area in which the teeth 4 extend, so that clearance is left for axial adjustment of the steering column jacket 1 relative to the support bearing 2. The locking member 5 is mounted with a pivot pin 7, whose longitudinal axis extends at right angles to the longitudinal axis 3 of the steering column jacket, and whose ends engage with the support bearing 2 (as best shown in FIG. 3), so that the locking member is able to perform a limited pivoting movement. However, the bearing bore of the locking member 5 is designed as an oblong hole 8, so that the locking member 5 can also be displaced in parallel to the longitudinal axis 3 within the extension of the oblong hole 8. Wedge bodies designed as eccentrics 10, whose wedge surfaces that define the eccentricity cooperate with complimentarily designed wedge surfaces on the inner wall 11 defining the recess 9, are mounted on the pivot pin 7 within a recess 9 of the locking member 5. Lever arms 12 are rigidly connected to the eccentrics 10, and the lever arms engage in a recess 13 of a wedge body 14 which is displaceable with a connecting link guide 15 in parallel to the longitudinal axis 3 of the steering column within the support bearing 2 by an actuating member not shown in the drawing. This wedge body 14 is displaceable with the wedge surfaces 17 between a stationary abutment 18 at the support bearing 2 and an abutment 19 at the locking member 5 in parallel to the longitudinal axis. The lever arms 12 of the eccentrics 10 are biased in the clockwise direction by a spring 20 that brings about the wedging of the eccentrics 10 with the wedge surfaces. Another spring 21 is fastened to the support bearing 2, on one hand, and is connected to the locking member 5, on the other hand, so that in the released position, it holds the latter automatically in a zero position, thereby disengaging the teeth 6 on the locking member 5 from the teeth 4 on the steering column jacket 1, enabling the locking member 5 to be adjusted longitudinally relative to the steering column jacket 1. In the example shown, the spring 21 is designed as a leaf spring, one end of which engages in a slot provided on the locking member 5, as is shown in FIG. 3. This figure also shows a symmetrical design in which two eccentrics 12 are accommodated on both sides of the locking member 5 in recesses 9 provided there. The swiveling motion of the arm 12 in the releasing direction is limited by a stop 22, whereas the amount of displacement of the wedge body 14 during release is defined by an end position of the connecting link guide 15. The embodiments according to FIGS. 1 and 2 are in agreement so far. In the embodiment shown in FIG. 1, a leaf spring 23 is provided on the locking member 5, and one end of this leaf spring is provided with a profile adapted to the tooth contour, so that a zero position of the locking member 5 can also be reached with this leaf spring 23 in the released position, because the profile at the end of the leaf spring 23 automatically slips into the deepest position of engagement in a space between the teeth 4. FIG. 4 shows an arrangement in accordance with the invention in which the locking elements are arranged in a mirror-inverted symmetrical arrangement to a plane passing through the central longitudinal axis 3 of the steering column.

The amount of displacement of the locking member 5 is determined by the length of the oblong hole 8. It equals half the tooth pitch in both directions from the middle position. The spring 21 cooperates with the spring 23. The spring 23 replaces one tooth of the locking member. During the displacement of the steering column jacket, this "elastic tooth", which initially meshes with the teeth 4 of the steering column jacket, moves along a tooth flank and up to the tip of a tooth in the teeth 4, here the locking member is pressed back into the base of the tooth of the teeth 4 under the action of the force of the spring 21, i.e., the locking member performs a periodic movement ("reciprocating movement") during the continuous displacement of the steering column jacket. The coil spring 20 ensures the logical course of the movements during locking and release. Radial wedging of the wedge body 14 is prevented until the eccentrics 10 bring the mechanism into the middle position. Radial biasing of the wedge body by its axial displacement takes place only thereafter. It is also possible to use a pivotable wedge body instead of such a wedge body.

In the embodiment according to FIG. 2, another leaf spring 24, which biases the locking member 5 with teeth 6 against the teeth 4 provided on the steering column jacket 1, is provided as an alternative to the leaf spring 23. The wedge body 14 ensures that the wedging of the eccentrics 10 in the recess 9 can occur only in the case of complete engagement of the teeth 4 and 6. However, the above-described arrangement with the leaf spring might operate with less noise and friction, because only the leaf spring 23 performs radially directed movements during the axial movement of the steering column jacket.

While specific embodiments of the invention have been shown and described in detail to illustrate the application of the principles of the invention, it will be understood that the invention may be embodied otherwise without departing from such principles.

What is claimed is:

1. A steering column for motor vehicles with axially adjustable steering shaft, a non-rotatable steering column jacket and a support bearing comprising:
    a locking member being pivotably mounted at a first end to a support bearing and disposed to perform limited pivoting movement and having a pivot axis which is perpendicular to the axis of the steering column jacket, the steering column jacket having a longitudinal row of teeth, the locking member having teeth on a second end arranged to mesh with said longitudinal row of teeth, said locking member being longitudinally displaceable by an amount which is at least the length of one tooth pitch of the locking member teeth;
    a first wedge body disposed to arrest longitudinal movement of the locking member;
    a second wedge body disposed to hold said locking member teeth toward meshing engagement with said row of longitudinal teeth.

2. A steering column according to claim 1 wherein said locking member and said first and second wedge bodies are arranged in pairs in mirror-inverted symmetry relative to an imaginary plane passing through the central longitudinal axis of the steering column.

3. A steering column according to claim 1 further comprising a first abutment mounted on said locking member, a second abutment mounted on said support bearing, said second wedge body being movable in a straight line between said first abutment and said second abutment, said first wedge body having eccentric surfaces, said locking member having a recess said recess having wedge surfaces, said eccentric surfaces cooperating with said wedge surfaces to arrest the locking member.

4. A steering column according to claim 3 wherein said first wedge body is rotatable and is biased to force said eccentric surfaces to abut said recess wedge surfaces of said locking member.

5. A steering column according to claim 1 wherein the movement of said first wedge body depends on the movement of said second wedge body.

6. A steering column according to claim 5 wherein said first wedge body has an arm, said second wedge body having a recess being defined on a forward end by a forward stop and on a rearward end by a rearward stop, said first wedge body arm extending into said second wedge body recess between said forward and said rearward stops.

7. A steering column according to claim 5 further comprising an actuating means disposed to overcome the biasing force of said second wedge body.

8. A steering column according to claim 1 wherein said first wedge body has an arm extending therefrom, said second wedge body having stops which engage said arm thereby causing said first wedge body to move upon a corresponding movement of said second wedge body.

9. A steering column according to claim 1 wherein said locking member includes a leaf spring attached to the locking member adjacent said first end, said leaf spring having a free end being shaped to mesh with said longitudinal row of teeth.

10. A steering column according to claim 1 further comprising a first spring being connected at a first spring end to the support bearing and biasing said locking member toward the steering column jacket adjacent said second end of said locking member, a second spring on the support bearing biasing the locking element to a middle position wherein said locking member teeth are disengaged from said longitudinal row of teeth and being positioned between said first end and said second end of said locking member.

11. A steering column according to claim 10 wherein said second spring is a bar spring.

12. A steering column according to claim 10 wherein said second spring is a leaf spring.

13. A longitudinally adjustable steering column locking device with a non-rotatable steering column jacket comprising:
    a pivot pin rigidly attached to the vehicle body, a locking member having a slotted hole at a first end and teeth at a second end said pivot pin arranged in said hole, said locking member being pivotable about said pivot pin and being movable in a direction parallel with the longitudinal axis of the said steering column jacket the movement of the locking element being restrained by interior surfaces of said slotted hole, said locking member having recesses on opposite sides thereof in the vicinity of said slotted hole, said recesses having eccentric interior surfaces;
    a first wedge body rotatably arranged on said pivot pin and having eccentric exterior surfaces arranged to cooperate with said locking member eccentric interior surfaces thereby preventing said locking member from pivotal movement while in a locking position, said first wedge body having an arm extending upwardly from said pivot pin;
    a second wedge body being movable longitudinally and having a recess therein defined by interior surfaces, said arm projecting into said locking member recess and being positionable by said interior surfaces by movement of said second wedge body.

14. A steering column according to claim 13 wherein the distance of movement of said locking member being substantially equal to the pitch of said locking member teeth.

* * * * *